(12) United States Patent
Yamamoto

(10) Patent No.: US 9,112,778 B2
(45) Date of Patent: Aug. 18, 2015

(54) COMMUNICATION CONTROL SYSTEM AND COMMUNICATION CONTROL METHOD

(71) Applicant: HITACHI KOKUSAI ELECTRIC INC., Chiyoda-ku, Tokyo (JP)

(72) Inventor: Kazuhiro Yamamoto, Kodaira (JP)

(73) Assignee: HITACHI KOKUSAI ELECTRIC INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/382,706

(22) PCT Filed: Jan. 28, 2013

(86) PCT No.: PCT/JP2013/051743
§ 371 (c)(1),
(2) Date: Sep. 3, 2014

(87) PCT Pub. No.: WO2013/132917
PCT Pub. Date: Sep. 12, 2013

(65) Prior Publication Data
US 2015/0024733 A1     Jan. 22, 2015

(30) Foreign Application Priority Data

Mar. 5, 2012 (JP) .................................. 2012-047592

(51) Int. Cl.
*H04M 3/00* (2006.01)
*H04L 12/24* (2006.01)
*H04W 24/06* (2009.01)
*H04W 88/08* (2009.01)

(52) U.S. Cl.
CPC ........... *H04L 41/0816* (2013.01); *H04W 24/06* (2013.01); *H04W 88/08* (2013.01)

(58) Field of Classification Search
None
See application file for complete search history.

(56) References Cited

U.S. PATENT DOCUMENTS

2013/0039390 A1*  2/2013  Vallette ..................... 375/148

FOREIGN PATENT DOCUMENTS

| JP | 2001-128237 A | 5/2001 |
|---|---|---|
| JP | 2005-333291 | 12/2005 |
| JP | 2008-245031 | 10/2008 |

* cited by examiner

*Primary Examiner* — Suhail Khan
(74) *Attorney, Agent, or Firm* — Taft Stettinius & Hollister LLP

(57) ABSTRACT

A technique capable of effectively using a plurality of wireless communication systems for wirelessly communicating by different communication schemes is proposed. The present invention is configured so that: a land station of a first wireless communication system, a land station of a second wireless communication system, and a control device are connected by a network; the control device transmits instructions for modifying communication software used in wireless communication into communication software corresponding to the second wireless communication system, the instructions being transmitted to a land station of the first wireless communication system; and the land station of the first wireless communication system modifies the communication software in accordance with the instructions from the control device, whereby the land station of the first wireless communication system made to operate as a land station of the second wireless communication system.

3 Claims, 8 Drawing Sheets

COMMUNICATION CONTROL SYSTEM AND COMMUNICATION CONTROL METHOD

TECHNICAL FIELD

The present invention relates to the control of a number of wireless communication systems for wireless communication in different methods of communication.

BACKGROUND ART

Properties of HF (high frequency) band (also referred to as shortwave band) radio wave propagation are described below. In a HF band wireless communication system (HF data communication system), communication is generally carried out by using the propagation of radio waves through the ionosphere. Such usage of the propagation of radio waves through the ionosphere makes long distance, over-the-horizon communication possible, where the ionosphere is affected by the season, the time zone, the solar activity and the like, and therefore, the frequency that can cover the target communication area varies depending on the season and the time zone.

Since HF bands have the above-described properties, a number of frequencies are generally used in an HF data communication system so as to correspond the communication area that varies depending on the season and the time zone. However, the HF band frequencies are limited, and thus, it is difficult to cover the properties of the propagation of radio waves in all the HF bands simply by using a number of frequencies.

PRIOR ART DOCUMENT

Patent Document

Patent Document 1: Japanese Unexamined Patent Publication 2005-333291

SUMMARY OF THE INVENTION

Problem to be Solved by the Invention

FIG. 7 shows an outline of a conventional HF data communication system. In the example in FIG. 7, a data communication device 51 (#1) installed in a first base uses communication software A, while a data communication device 51 (#2) installed in a second base uses communication software B. In addition, a receiving station 52 (#1) deployed in a mobile body (for example, a vessel or a vehicle) uses the communication software A. Thus, in most cases, the combinations of the data communication devices and the communication software are fixed in conventional HF data systems.

Here, for example, as in the case where the receiving station 52 (#1) is located within the communication area 53 of the data communication device 51 (#2) instead of within the communication area 53 of the data communication device 51 (#1), even in the case where the data communication device 51 (#2) is geographically more appropriate as the data transmitting station for the receiving station 52 (#1) than the data Communication device 51 (#1), there is a defect such that the data communication device 51 (#2) cannot use the communication software A that corresponds to the receiving station 52 (#1). Therefore, even in such cases, the data communication device 51 (#1) that is geographically far away from the receiving station 52 (#1) cannot help but be used as the data transmitting station for the receiving station 52 (#1).

As in an example of the device configuration shown in FIG. 8, in many cases, the data communication device 51 has a component 62 for primary modulation, which is referred to as a modulator, and a separate component 61 for secondary modulation, which is referred to as a radio. In addition, these components are equipped in locations that are geographically away from each other, and there is a defect that a connection fee for a dedicated line in the private sector is necessary in the case where the components are connected using the dedicated line.

The present invention is provided in view of the above-described situations according to the prior art, and an object thereof is to propose a technology that makes it possible to effectively use a number of wireless communication systems for wireless communication in different methods of communication in order to correspond the properties of the propagation of HF band radio waves that cannot be covered by a wireless communication system that simply uses a number of frequencies, such as an HF data communication system according to the prior art.

Means for Solving Problem

In order to achieve the above-described object, the communication control system and the communication control method according to the present invention are created such that a fixed station in a first wireless communication system, a fixed station in a second wireless communication system, and a control device are connected through a network; the control device transmits an instruction for changing communication software that is to be used for wireless communication to the fixed station in the first wireless communication system so that the communication software is changed to the communication software that corresponds to the second wireless communication system; and the fixed station in the first wireless communication system changes the communication software in accordance with the instructions from the control device, thereby operating the fixed station in the first wireless communication system as the fixed station in the second wireless communication system.

In this structure, the combinations between the fixed stations and the communication software in a number of wireless communication systems for wireless communication in different methods of communication can be dynamically changed in accordance with an instruction from the control device so that the availability of the wireless communication system can be increased and the durability can be maintained. That is to say, for example, wireless communication can be carried out with a mobile station in the second wireless communication system using a fixed station in the first wireless communication system in addition to a fixed station in the second wireless communication system, and therefore, the availability of the wireless communication system can be increased. In the case where the fixed station in the second wireless communication system is out of order, for example, the fixed station in the first wireless communication system is used for wireless communication so that the operation of the second wireless communication system can be maintained, and therefore, such effects can be gained that the durability of the wireless communication system can be maintained.

In addition, according to the present invention, the communication control system is formed such that the control device carries out a radio wave propagation simulation using the location of the fixed station in the first wireless communication system, the location of the fixed station in the second wireless communication system, and the location of a mobile station with which the second wireless communication system communicates, and as a result transmits an instruction for changing the communication software to the fixed station in the first wireless communication system in the case where the fixed station in the first wireless communication system is determined to be more appropriate for wireless communication with the mobile station than the fixed station in the second wireless communication system.

In this structure, wireless communication can be carried out with a mobile station in the second wireless communication system by using a fixed station in the first wireless communication system deployed in a location that is more appropriate for wireless communication than the fixed station in the second wireless communication system, and thus, it is possible to effectively improve the quality of communication. In the case of wireless communication using an HF band, a radio wave propagation simulation can be carried out, taking into consideration the factors that can affect the HF band radio wave propagation (for example, the current season and time zone), so that the communication software in the fixed station can be changed following the radio wave propagation situation that changes moment by moment, and thus, good communication quality can be gained.

Effects of the Invention

According to the present invention, the combinations between the fixed stations and the communication software in a number of wireless communication systems for wireless communication in different methods of communication can be dynamically changed in accordance with an instruction from the control device so that the availability of the wireless communication system can be increased and the durability can be maintained.

PREFERRED EMBODIMENTS OF THE INVENTION

An embodiment of the present invention is described in reference to the drawings. In the following, a wireless communication system for wireless communication between a land station (an example of a fixed station) installed in a land base and a mobile station deployed on a sea-going vessel is cited as an example for the description of a communication control system for controlling a number of wireless communication systems for wireless communication in different methods of communication.

Figure 1:
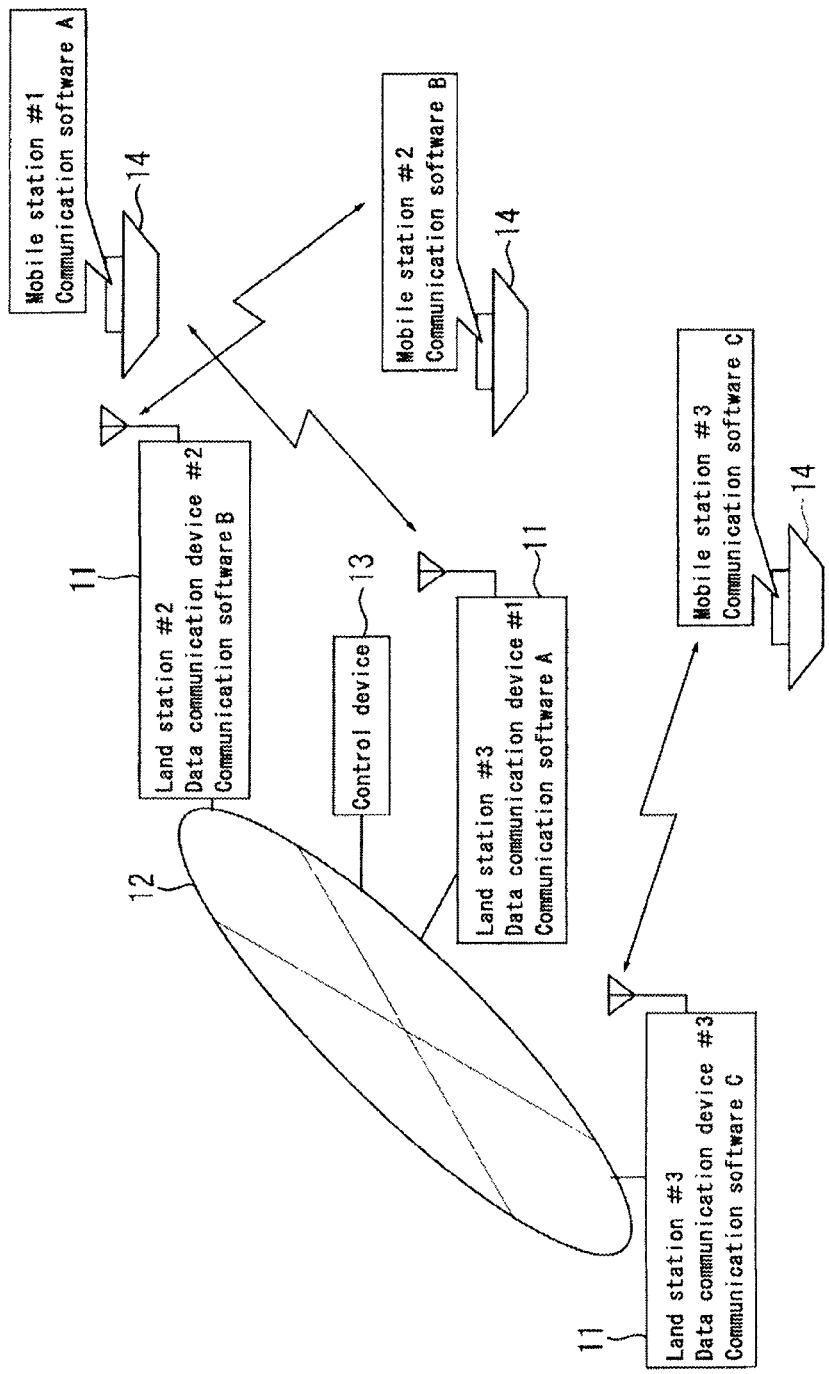
FIG. 1 is a diagram schematically showing an example of the configuration of a communication control system according to one embodiment of the present invention.

FIG. 1 schematically shows an example of the structure of the communication control system according to one embodiment of the present invention. The wireless communication system to be controlled by the communication control system according to the present embodiment is formed of arrangements on land and on the sea when roughly categorized. The arrangements on land include a number of land stations 11 that are deployed in bases geographically away from each other and a control device 13, where the land stations 11 and the control device 13 are connected so that communication is possible through a network 12, such as the Internet and Intranet. In addition, the arrangements on the sea include a number of mobile stations 14 deployed in respective sea-going vessels. Though FIG. 1 shows three land stations 11 (#1 to #3) and three mobile stations 14 (#1 to #3) as an example, there may be any number of these stations.

The mobile station 14 (#1) carries out wireless communication using the communication software A that corresponds to the first wireless communication system. In addition, the land station 11 (#1) is provided with a data communication device (#1) of which the base setting is wireless communication using the communication software A. That is to say, the first wireless communication system is set so that wireless communication is carried out with the mobile station 14 (#1) basically using the land station 11 (#1).

The mobile station 14 (#2) carries out wireless communication using the communication software B that corresponds to the second wireless communication system. In addition, the land station 11 (#2) is provided with the data communication device (#2) of which the base setting is wireless communication using the communication software B. That is to say, the second wireless communication system is set so that wireless communication is carried out with the mobile station 14 (#2) basically using the land station 11 (#2).

The mobile station 14 (#3) carries out wireless communication using the communication software C that corresponds to the third wireless communication system. In addition, the land station 11 (#3) is provided with the data communication device (#3) of which the base setting is wireless communication using the communication software C. That is to say, the third wireless communication system is set so that wireless communication is carried out with the mobile station 14 (#3) basically using the land station 11 (#3).

Here, each of the data communication devices (#1 to #3) provided in the land stations 11 (#1 to #3) is formed so that the communication software can be rewritten (changed) by adopting a software wireless design, and thus can be operated as a fixed station in a wireless communication system other than the wireless communication system that has been set as the base when the communication software is rewritten as required. An instruction for rewriting the communication software is sent from the control device 13 via the network 12. These operations can be implemented using well-known technologies, and the technology disclosed in Japanese Unexamined Patent Publication 2007-89121 can be used as the software wireless design, for example.

Figure 2A:
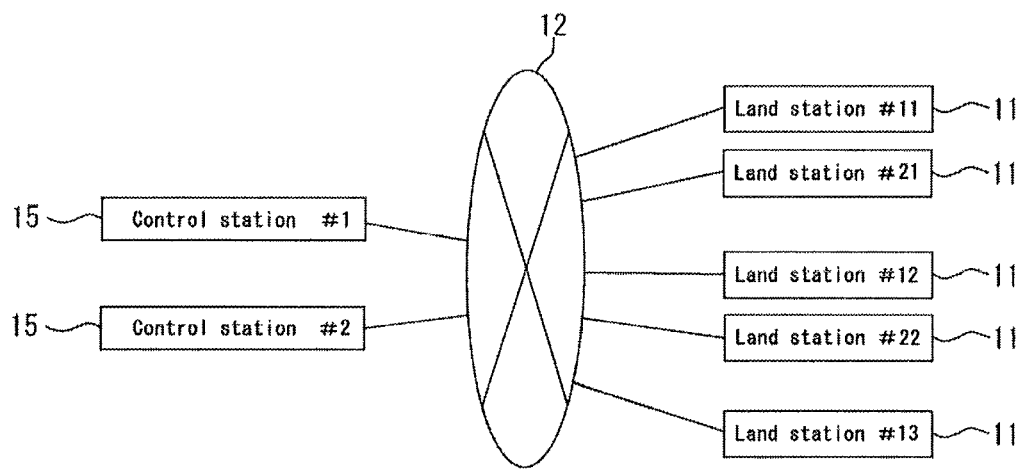
FIGS. 2(a) to 2(c) are diagrams showing examples where a number of wireless communication systems are connected through a network.
Figure 2B:
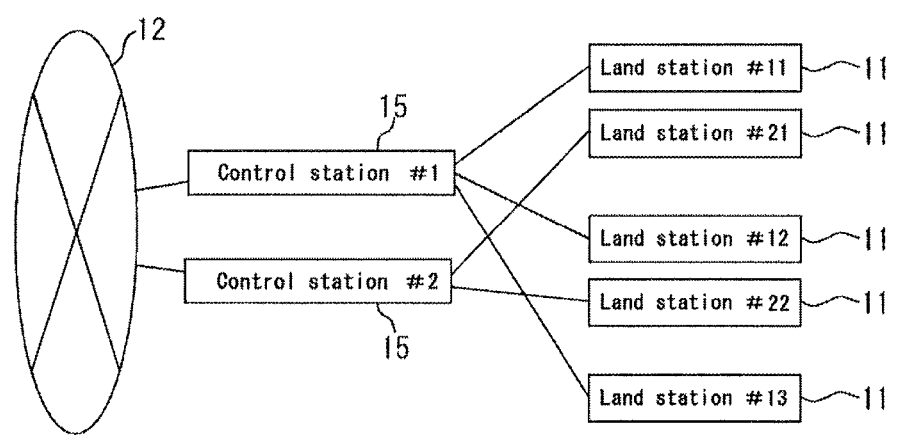
Figure 2C:
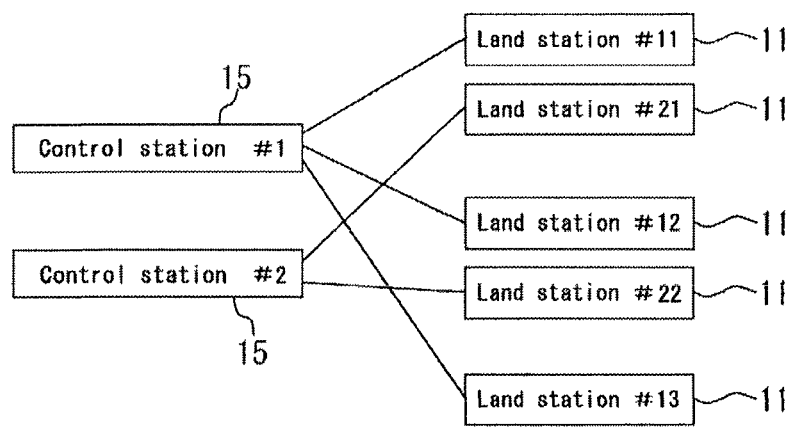

Next, the connection of a number of wireless communication systems is described in reference to FIGS. 2(a) to 2(c). FIGS. 2(a) to 2(c) show examples of a first wireless communication system having three land stations 11 (#11 to #13) and a control station 15 (#1) for regulating the land stations, and a second wireless communication system having two land stations 11 (#21 and #22) and a control station 15 (control station #2) for regulating the land stations. Here, the control station 15 (#1) in the first wireless communication system generally controls the transmission of information to a mobile station that belongs to the first wireless communication system and the reception of information from such a mobile station. In addition, the control station 15 (#2) in the second wireless communication system generally controls the transmission of information to a mobile station that belongs to the second wireless communication system and the reception of information from such a mobile station.

FIG. 2(c) illustrates the configuration before these wireless communication systems are connected to each other through a network of which the mechanism allows the respective wireless communication systems to operate independently. That is to say, the control station 15 (#1) in the first wireless communication system cannot access a land station 11 (#21 or #22) in the second wireless communication system. In addition, the control station 15 (#2) in the second wireless communication system cannot access a land station 11 (#11 to #13) in the first wireless communication system.

FIG. 2(a) illustrates the configuration of the network that is adopted for the communication control system according to the present embodiment, where the land stations 11 (#11 to #13, #21 and #22) and the control stations 15 (#1 and #2) in the respective wireless communication systems are all connected via a network 12. In this configuration, the control station 15 (#1) in the first wireless communication system can access a land station 11 (#21 or #22) in the second wireless communication system, and in addition, the control station 15 (#2) in the second wireless communication system can access a land station 11 (#11 to #13) in the first wireless communication system.

FIG. 2(b) illustrates another configuration where a number of wireless communication systems are connected through a network, where the control stations 15 in the respective wireless communication systems are connected via a network 12. In this configuration, the control station 15 (#1) in the first wireless communication system can access a land station 11 (#21 or #22) in the second wireless communication system through the control station 15 (#2) in the second wireless communication system, and in addition, the control station 15 (#2) in the second wireless communication system can access a land station 11 (#11 to #13) in the first wireless communication system through the control station 15 (#1) in the first wireless communication system.

In the case where the respective wireless communication systems have different communication methods, it is not sufficient to connect the number of wireless communication systems through a network and a further scheme becomes necessary. That is to say, it is necessary for the land station 11 to be used for wireless communication with a mobile station 14 with which communication is to be made to fit the communication method in the wireless communication system to which the mobile station 14 belongs. Therefore, in the present embodiment, a software wireless design is adopted for the data communication devices in the respective land stations 11 as described above so as to provide a configuration where each land station 11 can rewrite (modify) the communication software used for wireless communication.

Figure 3A:
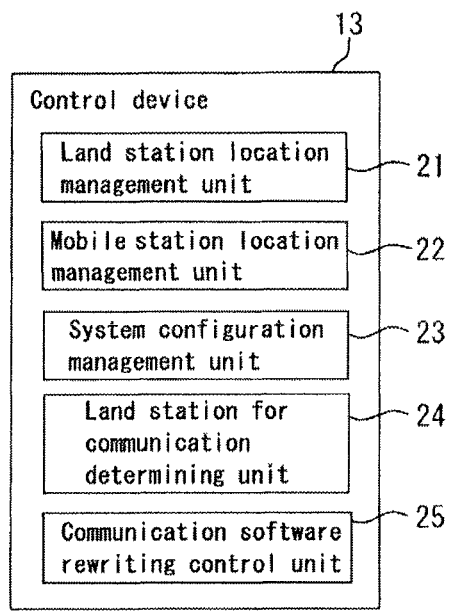
FIGS. 3(a) and 3(b) are diagrams showing examples of function blocks of a control device and a land station.
Figure 3B:
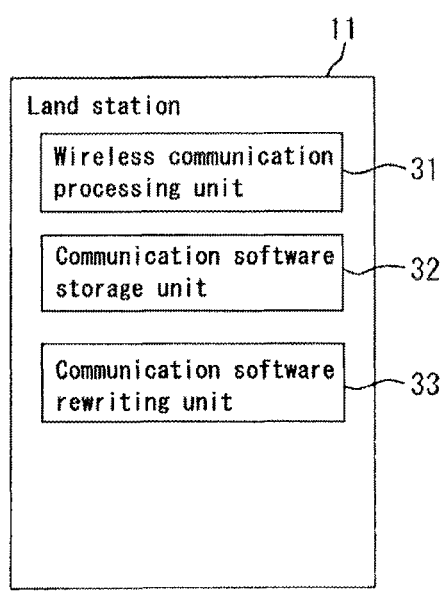

FIGS. 3(a) and 3(b) show examples of function blocks of the parts that relate to the rewriting of the communication software in the control device 13 and a land station 11. As shown in FIG. 3(a), the control device 13 in the present embodiment has a land station location management unit 21 for managing the locations (longitudes and latitudes) where land stations 11 are installed, a mobile station location management unit 22 for managing the current locations (longitudes and latitudes) of mobile stations 14, a system configuration management unit 23 for managing the configurations of the respective wireless communication systems (corresponding relationship between the control stations 15 and land stations 11 and the like), a land station for a communication determining unit 24 for determining the land station 11 to be used for wireless communication with the mobile station 14 with which communication is to be made, and a communication software rewriting control unit 25 for controlling the rewriting of the communication software in the land stations 11. Here, the current location of a mobile station 14 can be found when the mobile station 14 acquires the location information on itself through a GPS (global positioning system) function and transmits this information to the control device 13 using a communication means, such as a satellite communication system.

In addition, as shown in FIG. 3(b), the land stations 11 in the present embodiment have a wireless communication processing unit 33 for wireless communication with a mobile station 14, a communication software storage unit 31 for storing a number of pieces of communication software, and a communication software rewriting unit 32 for rewriting the communication software to be used by the wireless communication processing unit 33 for wireless communication.

The process for rewriting the communication software is described by citing an example of a case where information to be sent to a mobile station 14 that belongs to the second wireless communication system is transmitted using a land station 11 in the first wireless communication system. First, a user inputs a communication request into the control station 15 in the second wireless communication system by designating a mobile station 14 that belongs to the second wireless communication system as a target with which communication is to be made. The mobile station 14 is designated by using identification information that is specific to each mobile station 14, for example. The control station 15 that receives the input of the communication request transmits a message for inquiring which land station 11 is installed in a location that is appropriate for wireless communication with the designated mobile station 14 to the control device 13.

When the control device 13 receives the inquiry message from the control station 15, the land station for communication determining unit 24 specifies the land station 15 that is installed in the location that is appropriate for wireless communication with the designated mobile station 14 on the basis of information, such as all the locations where the land stations 11 managed by the land station location management unit 21 are installed and the current location of the designated mobile station 14 that is managed by the mobile station location management unit 22, and thus determines the land station 15 as that used for wireless communication. Concretely, for example, the land station for communication determining unit 24 calculates the situations of the propagation of radio waves transmitted from each land station 11 for the current season and time zone through a radio wave propagation simulation, and specifies the land station 11 from which radio waves are transmitted that provide good reception quality to the current location of the designated mobile station 14 as the land station 11 that is installed in the location that is appropriate for wireless communication with this mobile station 14.

Next, in reference to the system configuration management unit 23, the communication software rewriting control unit 25 determines whether or not the land station 11 determined by the land station for communication determining unit 24 belongs to the same wireless communication system (the second wireless communication system in the present embodiment) as the control station 15 from which the inquiry message has been transmitted. As a result of the above-described determination, in the case where the land station 11 belongs to the second wireless communication system, the communication software rewriting control unit 25 notifies the control station 15 from which the inquiry message has been transmitted of the land station 11 determined by the land station for communication determining unit 24. Meanwhile, in the case where it is determined that the land station 11 does not belong to the second wireless communication system, the communication software rewriting control unit 25 instructs the rewriting (modification) of the communication software to the land station 11 determined by the land station for communication determining unit 24. The instruction of rewriting the communication software is to designate the communication software that corresponds to the wireless communication system to which the control station 15 from which the inquiry message has been transmitted belongs.

When the land station 11 receives an instruction to rewrite the communication software from the control device 13, the communication software rewriting unit 33 reads out the communication software designated by the instruction to rewrite (communication software corresponding to the second wireless communication system in the present embodiment) from the communication software storage unit 32 and rewrites the communication software to that to be used by the wireless communication processing unit 33. As a result of the rewriting of the communication software, the modification method, transmission speed, frequency, output power, communication format, access method and the like are changed.

After the completion of the rewriting of the communication software, the land station 11 notifies the control device 13 to the effect that the rewriting of the communication software has been completed. When the control device 13 receives a notice of the completion of the rewriting of the communication software from the land station 11, the communication software rewriting control unit 25 updates the configuration of each wireless communication system that is managed by the system configuration management unit 23 (corresponding relationship between the control station 15 and the land station 11 and the like) and notifies the control station 15 from which the inquiry message has been transmitted of the land station 11 that has been determined by the land station for communication determining unit 24.

Upon reception of the notice of the land station 11 from the control device 13, the control station 15 makes wireless communication with the mobile station 14 that has been designated by the communication request by using the land station 11 that has been notified. After the completion of the wireless communication using the land station 11 where the communication software has been rewritten, the communication software in the land station 11 is rewritten to the communication software according to the base setting, and thus returns to the original communication software under the control by the communication software rewriting control unit 25 in the control device 30.

As a result of the above-described procedure, the second wireless communication system can transmit the information to be sent to a mobile station 14 under the command of the system by using a land station 11 in the first wireless communication system that is installed in a base that is locally more appropriate than the land stations 11 in the second wireless communication system, and therefore, good communication quality can be gained.

Though the configuration allows the control station 15 in each wireless communication system and the control device 13 to communicate with each other in the present embodiment, other configurations may be adopted. That is to say, such configurations may be provided that the control device 13 may be incorporated into the control station 15 in any of the wireless communication systems, and the control stations 15 in all the wireless communication systems and the control device 13 are formed as an integrated device. Though the land stations 11 store a number of pieces of communication software in the communication software storage unit 31 in the present embodiment, such a configuration may be provided that the control device 13 stores a number of pieces of communication software so that the communication software data is distributed to a land station 11 at the time when the instruction to rewrite the communication software is received.

Figure 4:
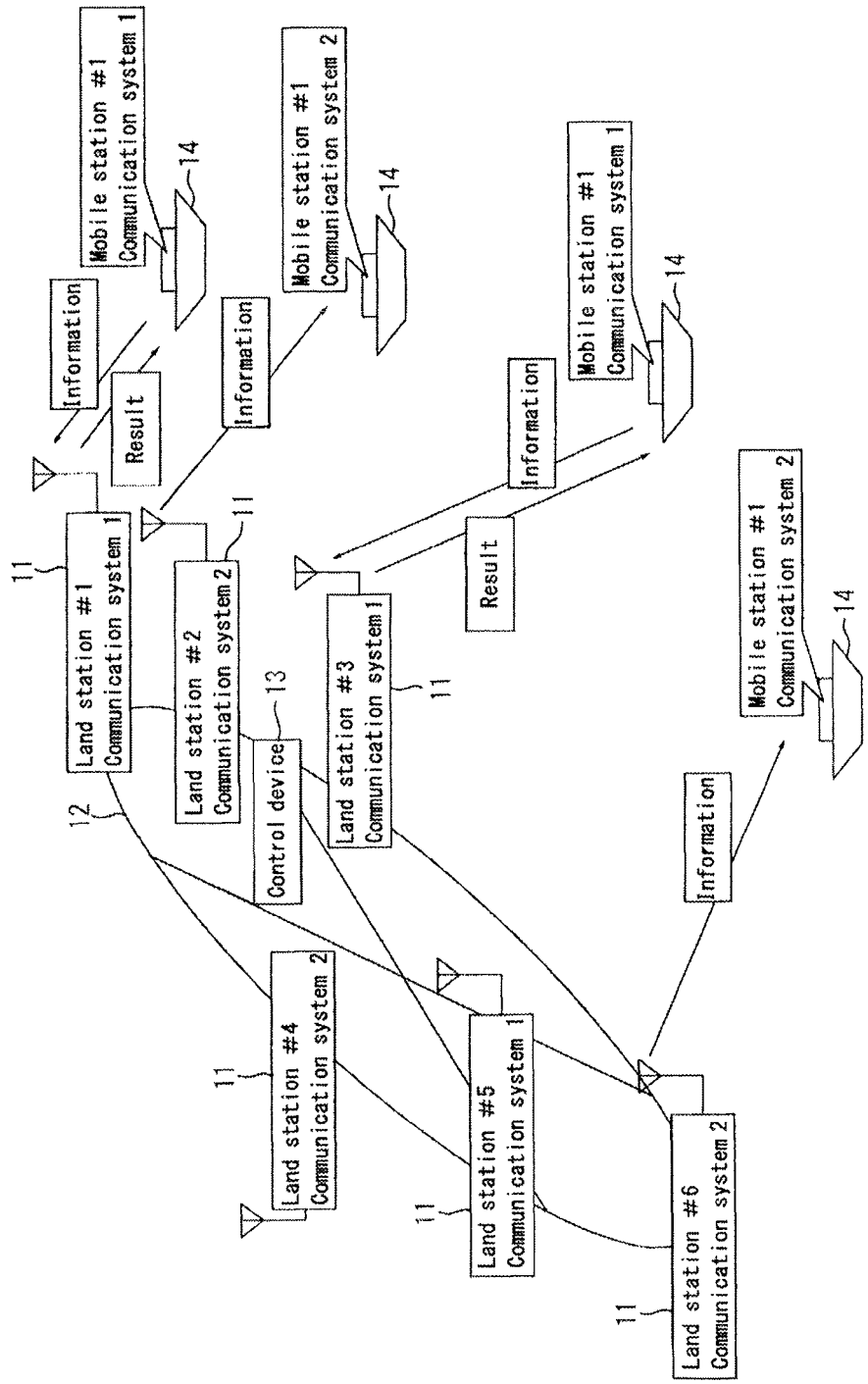
FIG. 4 is a diagram for illustrating an example to which the changing of the communication software in a land station is applied.
Figure 5:
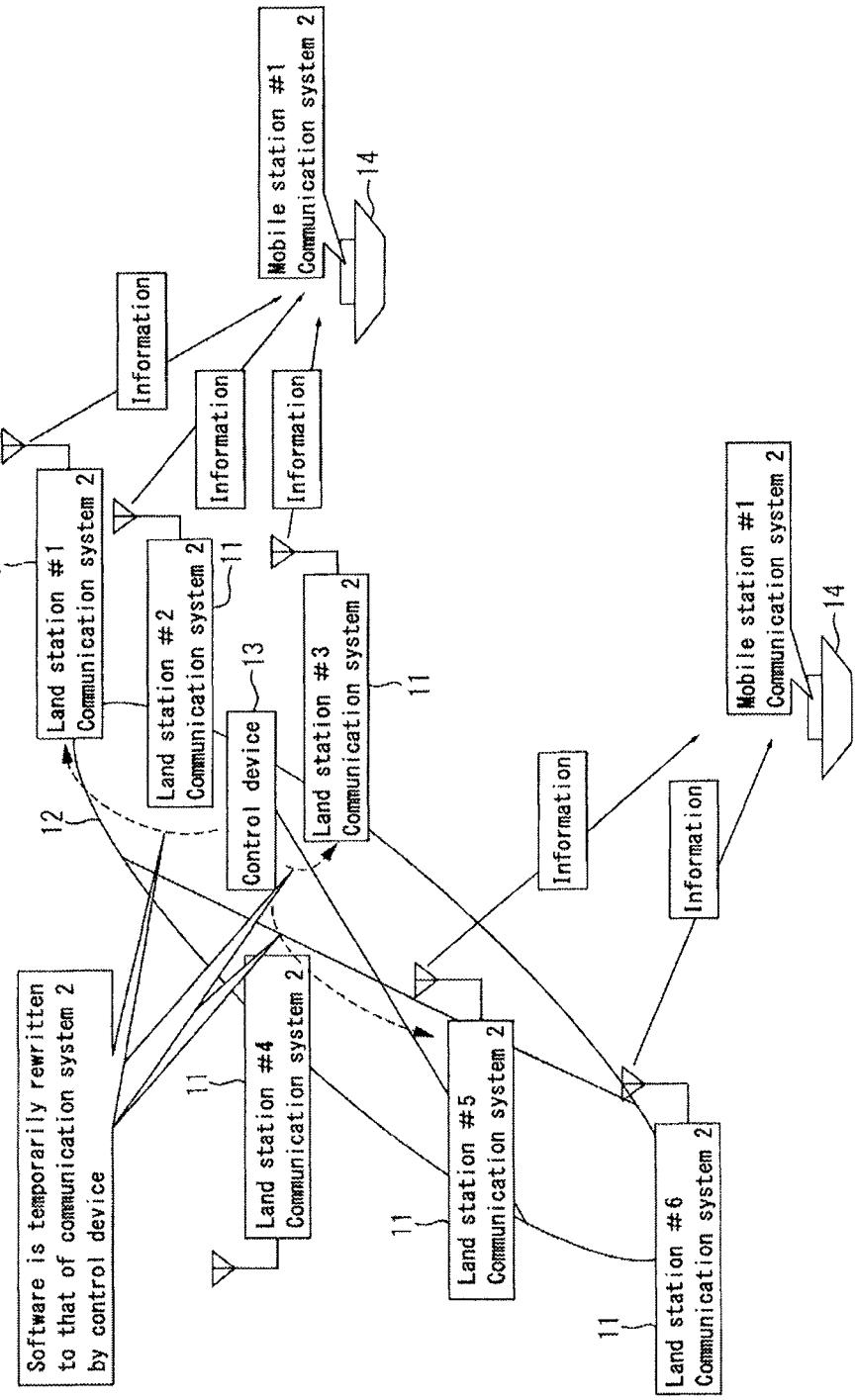
FIG. 5 is a diagram for illustrating an example to which the changing of the communication software in a land station is applied.
Figure 6:
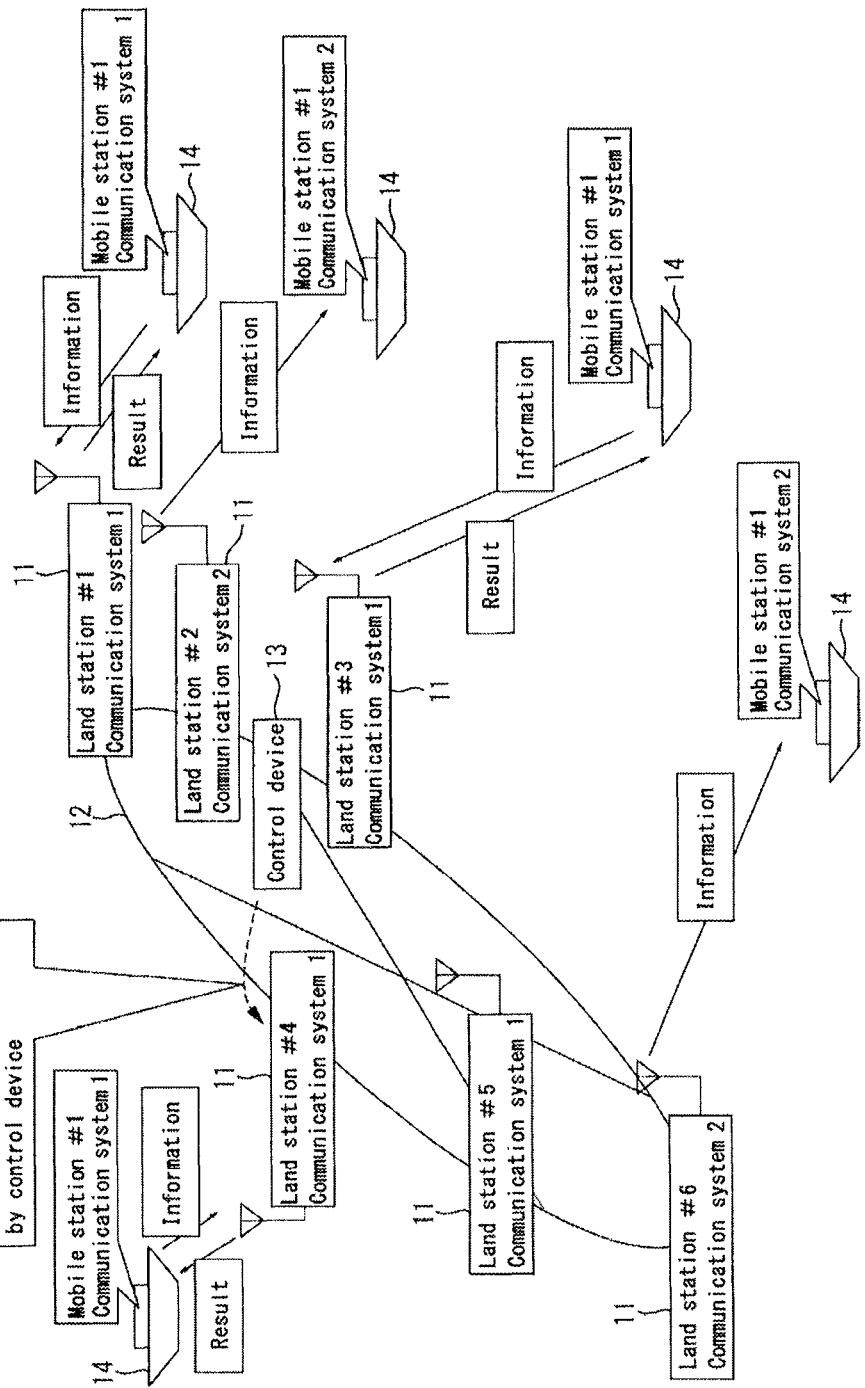
FIG. 6 is a diagram for illustrating an example to which the changing of the communication software in a land station is applied.
Figure 7:
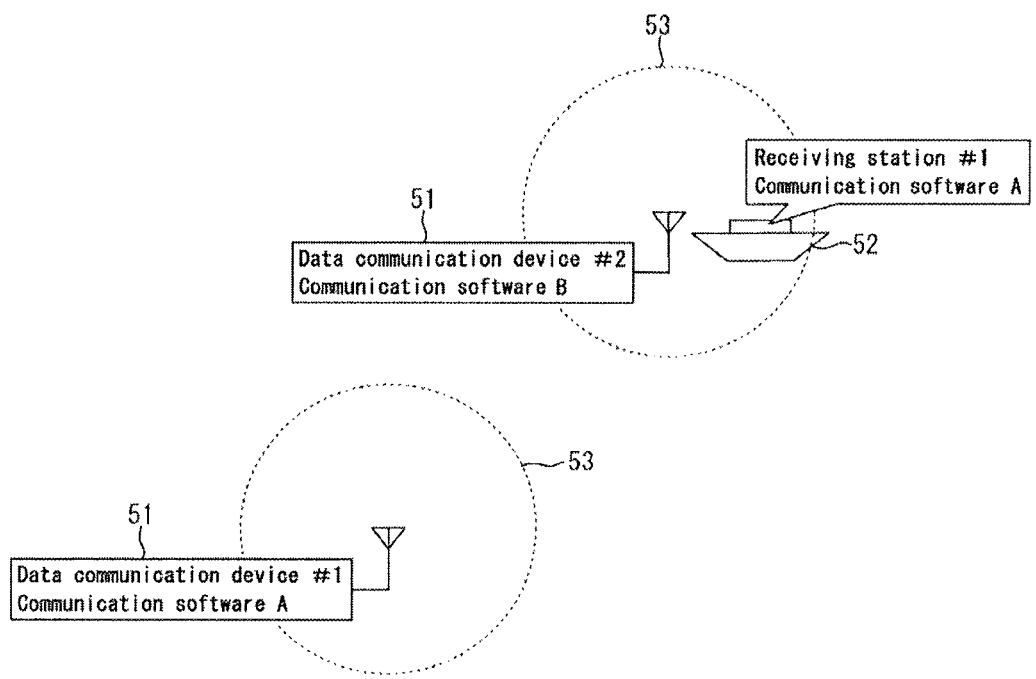
FIG. 7 is a diagram showing the outline of a conventional HF data communication system.
Figure 8:
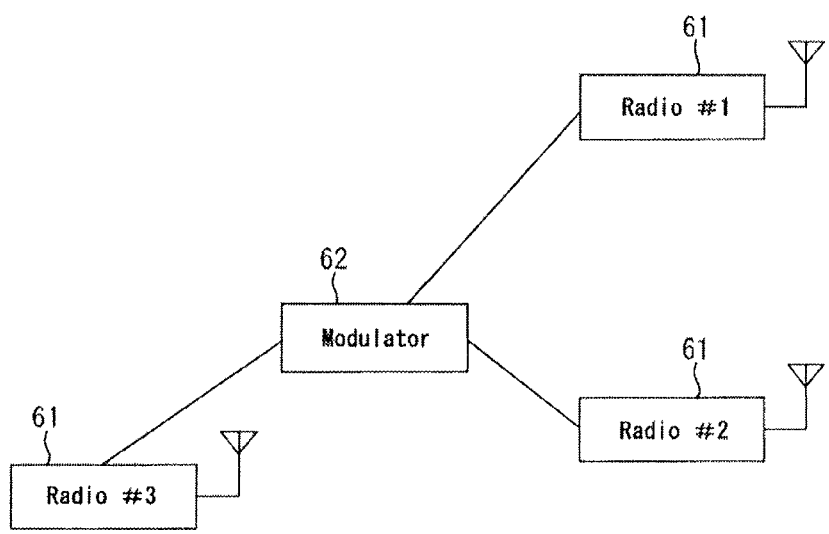
FIG. 8 is a diagram showing an example of the configuration of a data communication device in a conventional HF data communication system.

Next, other cases where a change of the communication software in a land station 11 is applied are described in reference to FIGS. 4 to 6. FIG. 4 shows an example of a first wireless communication system where information from a mobile station 14 is received by three land stations 11 (#1, #3 and #5) that are dispersed in different bases and one land station 11 responds to the mobile station 14 regarding the result of reception, and a second wireless communication system where information is transmitted to the mobile station 14 from three land stations 11 (#2, #4 and #6) dispersed in different bases in a broadcasting format.

In the configuration where there are two wireless communication systems as described above, in the case where important information is desired to be transmitted to a mobile station 14 without fail in the second wireless communication system, for example, the number of land stations 11 that can transmit information is increased in order to increase the probability of the information being sent to the mobile station 14. In such a case as in the example shown in FIG. 5, the control device 13 instructs a temporary change of the communication software in the land stations 11 in the first wireless communication system to the communication software for the second wireless communication system via a network 12 so that the land stations 11 in the first wireless communication system can operate as the land stations 11 in the second wireless communication system. As a result, the number of land stations 11 that transmit information in the second wireless communication system can be temporarily increased, and thus, the communication quality can be improved.

In the case where the longitude and the latitude of the mobile station 14 with which communication is to be made have already been found in the first wireless communication system, for example, and in the case where a land station 11 in the second wireless communication system is locally easy to receive information from the mobile station 14 according to the results of a radio wave propagation simulation, as shown in FIG. 6, the land station 11 may temporarily operate as the land station 14 in the first wireless communication system under the control of the control device 13. In this case, there are methods according to which a user operates the control device 13 after checking the results of the radio wave propagation simulation so as to switch the communication software in the land station 14, and according to which the control device 13 takes in the results of the radio wave propagation simulation so as to automatically switch the communication software.

In addition, in the first wireless communication system, for example, in the case of a configuration where information transmitted from a mobile station 14 is received by a number of land stations 11 and the results of reception in response to this information are transmitted by one land station 11, the land station 11 having the highest reception quality from among the number of land stations 11 that have received the information transmitted from the mobile station 14 may be determined using information such as an equalization error in a modem, and the communication software in the data communication device in the land station 11 having the highest reception quality may be changed to the communication software corresponding to the transmission of the reception results so that the reception results can be transmitted to the mobile station 14 from the land station 11 having the highest reception quality.

As described above, according to the present invention, the combination of each of the fixed stations in a number of wireless communication systems for wireless communication in different communication methods and the communication software can be dynamically changed by an instruction from the control device. As a result, it is possible to dynamically change the configuration of the wireless communication systems flexibly corresponding to the factors such as the importance of the information, the locations of the mobiles stations that affect the propagation of HF band radio waves, the current season, and the date and time, and thus, the availability of the wireless communication systems can be increased. In the case where the wireless communication system having a high priority is out of order, the communication software in a wireless communication system having a low priority can be rewritten into the communication software of the wireless communication system having the high priority so that the operation of the wireless communication system having the high priority can be maintained, and thus, such effects can be gained that the durability of the wireless communication system can be maintained.

The configurations of the systems, devices and the like according to the present invention are not necessarily limited to those described above, and various configurations may be used. In addition, the present invention can also provide a method or a system for carrying out the process according to the present invention, a program for implementing this method or system, and a recording medium for recording this program as well as various systems and devices using this medium. In addition, the fields to which the present invention can be applied are not necessarily limited to those described above, and the present invention can be applied to various fields. Furthermore, the various types of processes carried out in the system, device or the like according to the present invention may be implemented in the structure where a control program stored in a ROM (read only memory) is run by a processor in a hardware resource provided with a processor, memory and the like, for example, or may be implemented as a hardware circuit where the respective functional means for implementing the processes are independent. Moreover, the present invention can be implemented as a recording medium that can be read by a computer, such as a floppy disk (registered trademark) or a CD-ROM (compact disc ROM) that stores the above-described control program, or can be implemented as such a control program by itself so that the control program is inputted into a computer from the recording medium so as to be run in a processor, and thus, the process according to the present invention can be implemented.

EXPLANATION OF SYMBOLS

11: Land station
12: Network
13: Control device
14: Mobile station
15: Control station
21: Land station location management device
22: Mobile station location management device
23: System configuration management unit
24: Land station for communication determining unit
25: Communication software rewriting control unit
31: Wireless communication processing unit
32: Communication software storage unit
33: Communication software rewriting unit
51: Data communication device
52: Receiving station
53: Communication area
61: Radio
62: Modulator

The invention claimed is:

1. A communication control system, comprising:
a first fixed station in a first wireless communication system,
a second fixed station in a second wireless communication system, and
a control device, wherein
the first fixed station, the second fixed station, and the control device are connected through a network,
the control device carries out a radio wave propagation simulation using a location of the first fixed station, a location of the second fixed station, and a location of a mobile station with which the second wireless communication system communicates,
and as a result of the simulation, the control device transmits an instruction for changing communication software that corresponds to the second wireless communication system to the first fixed station, in the case where the first fixed station is determined to be more appropriate for wireless communication with the mobile station than the second fixed station, and
the first fixed station changes the communication software in accordance with the instruction from the control device, thereby
operating the first fixed station as the second fixed station.

2. The communication control system according to claim 1, wherein
at least one of the first and second fixed stations is a land station installed in a land base, and the mobile station is deployed on a sea-going vessel.

3. A communication control method used in a system having a first fixed station in a first wireless communication system, a second fixed station in a second wireless communication system, and a control device connected through a network, the method comprising:
performing a radio wave propagation simulation, wherein the control device performs the radio wave propagation simulation using a location of the first fixed station a location of the second fixed station, and a location of a mobile station with which the second wireless communication system communicates,
as a result of the simulation, transmitting of an instruction by the control device for changing communication software that corresponds to the second wireless communication system to the first fixed station, in the case where the first fixed station is determined to be more appropriate for wireless communication with the mobile station than the second fixed station, and
changing of the communication software by the first fixed station in accordance with the instruction from the control device, thereby
operating the first fixed station as the second fixed station.

* * * * *